United States Patent [19]
Brown et al.

[11] Patent Number: 5,337,197
[45] Date of Patent: Aug. 9, 1994

[54] METHOD AND SYSTEM FOR MAINTAINING DIRECTORY CONSISTENCY IN MAGNETO-OPTIC MEDIA

[75] Inventors: Lawrence S. Brown; Douglas W. Dewey; Tharon Hall, all of Tucson, Ariz.

[73] Assignee: International Business Machines Corporation, Armonk, N.Y.

[21] Appl. No.: 89,365

[22] Filed: Jul. 9, 1993

[51] Int. Cl.⁵ .......................... G11B 5/09; H04N 5/76
[52] U.S. Cl. ........................ 360/48; 369/59; 395/425; 395/575
[58] Field of Search ............. 360/48, 53, 59, 13, 360/66; 369/30, 32, 59; 395/425, 575

[56] References Cited

U.S. PATENT DOCUMENTS

| | | | |
|---|---|---|---|
| 4,788,672 | 11/1988 | Toyooka et al. | 369/30 |
| 5,048,004 | 9/1991 | Deguchi et al. | 369/54 |
| 5,062,009 | 10/1991 | Yamagata et al. | 360/33.1 |

OTHER PUBLICATIONS

J. E. Kulakowski, R. J. Means, G.F. Sims and M. Tayefeh, "Erase Detection and Error Recovery for Optical Files," IBM Technical Disclosure Bulletin, vol. 32, No. 6A, Nov. 1989, pp. 319–324.

T. J. Friedl, L. E. Gregg, D. F. Nagle and R. K. Rolfe, "Error Recovery for Magneto-Optical Disks," IBM Technical Disclosure Bulletin, vol. 32, No. 8B, Jan. 1990, pp. 411–414.

Primary Examiner—Donald Hajec
Assistant Examiner—T. N. Forbus, Jr.
Attorney, Agent, or Firm—Baker, Maxham, Jester & Meador

[57] ABSTRACT

The invention provides a system and method for making a data update, such as a directory update, to a magneto-optic disk which includes: copying designated directory sectors from the disk to a cache buffer, the designated directory sectors containing the portion of the directory which is to be updated; updating the directory portion to be updated in the cache buffer to provide an updated directory portion; writing the updated directory portion to a directory consistency block on the disk so as to provide a backup of the updated directory portion; erasing the designated directory sectors from the disk; writing the updated directory portion from the cache buffer to the designated directory sectors; verifying that the updated directory portion has been written to the designated directory sectors on the disk; and erasing the directory consistency block if there is verification that the updated directory portion has been written to the designated directory sectors on the disk. The system and method may further include recovery of the updated directory portion from the directory consistency block if the updated directory portion has not been written to the designated directory sectors, which would be evident from the non-erased state of the directory consistency block.

29 Claims, 7 Drawing Sheets

METHOD AND SYSTEM FOR MAINTAINING DIRECTORY CONSISTENCY IN MAGNETO-OPTIC MEDIA

BACKGROUND OF THE INVENTION

1. Field of the Invention

The present invention relates to magneto-optic media which contains a data consistency block, the data consistency block indicating whether or not a directory corruption has occurred during writing of data to the media.

2. Discussion of the Related Art

Magneto-optical disks (MO disks) have the capacity of storing large amounts of data per unit volume. The advantage of an MO disk over a WORM optical disk is that the MO disk can be erased for updating data. The MO disk differs from magnetic tape or magnetic disk media in that the MO disk requires a three-pass write (erase, write and verify) to update the information on the disk. This means that during one revolution of the disk the sectors of the disk which contain the data to be updated must be erased and then on the next revolution of the disk the updated data is written to the affected sectors, on third pass data is read back to verify correctness. This is unlike magnetic tape or disk media which can be updated simply by writing new data over the old data, without an erase pass. It is important with MO disks that there be no intervention between the erase pass and the write pass of new data. If there is a power outage or other interruption after an erase pass, but before the write pass is completed, the data on the MO disk is considered corrupted.

If data on an MO disk is corrupted, it is important that the user be notified. After there is knowledge that there is corrupt data on the MO disk it is important that there be a positive method of recovery. Several schemes have been proposed to detect and recover corrupted data on an MO disk. One scheme is to use intent and update counters which are written on the MO disk. When a data update is made the intent counter is incremented to its next highest integer. Assume for example that each of the intent and update counters indicate the integer 25. Preparatory to an update a three-pass write is issued to increment the intent counter to the next highest integer (26). Next, a three-pass write is issued to the affected sectors on the MO disk to perform the update. After the update has been verified, the update counter is incremented to the next highest integer, (26), by another three-pass write. This scheme will indicate to subsequent users that the last update to the MO disk was successful. When the updated data is next accessed the intent and update counters are first inspected. In the example both counters contain 26, which indicates that the data on the MO disk is not corrupted. However, should the contents of the intent and update counters be unequal, this will indicate that the last update was not successful and that the data has been corrupted. Recovery measures will then be taken including accessing the updated data and issuing a three-pass write to the affected sectors on the MO disk, provided the updated data has been stored to some stable memory device.

The problem with the above scheme for detecting corrupted data on an MO disk is that it requires three three-pass writes in addition to the work to back up the updated data. First, there is a three-pass write to the intent counter, then there is a three-pass write to the affected sectors on the MO disk, and then there is a three-pass write to the update counter. When a large amount of updates are made, this requires time to seek between the intent and update counters and time for the MO disk to make the number of revolutions for three three-pass writes. When performing updates in an MO disk library, the accumulation of the above time periods becomes quite significant. In addition storing of the updated data also needs to be accomplished The standard method of providing this type of protection on magnetic devices is to write the updated data to the disk itself, perform the update, then issue another write to indicate that the disk is consistent. Direct application of this technique to MO devices also results in a minimum of three three-pass writes to the media. The present invention replaces two of the three-pass writes with one two-pass write (a write and verify pass) and one one-pass erase.

Other approaches involve changing the directory structure or keeping it in duplicate. These approaches have negative performance and/or media utilization consequences.

SUMMARY OF THE INVENTION

The present invention provides a method and system for detecting and recovering data corruption on an MO disk with simply a two-pass write (write and verify) and a three-pass write (erase, write and verify) and a one one-pass erase. The invention can be employed for updating all types of data on an MO disk. However, data updates which are specifically directory updates are more serious since the directory on the MO disk controls all of the data that it encompasses. For this reason, the invention is described in reference to directory updates. However, it should be understood that the invention can be used for other types of data updates.

The method and system of making a directory update to a MO disk includes: copying from the disk to a cache buffer designated directory sectors, which sectors contain the portion of the directory which is to be updated; updating the directory portion to be updated in the cache buffer to provide an updated directory portion; writing the updated directory portion with header information to a directory consistency area or block on the disk so as to provide a backup of the updated directory portion; erasing the designated directory sectors from the disk; writing the updated directory portion from the cache buffer to the designated directory sectors; verifying that the updated directory portion has been written to the designated directory sectors on the disk; and erasing the directory consistency block if there is verification that the updated directory portion has been written to the designated directory sectors on the disk.

The method and system may further include processing of the MO disk during subsequent use. This includes: mounting the disk in a drive; reading the data consistency block from the disk into a memory storage medium; determining whether or not the directory consistency block has been erased, the directory consistency block containing the last updated directory portion with the header information if the directory consistency block has not been erased; if the directory consistency block has not been erased, then erasing again the designated directory location on the disk; writing the updated data from the directory consistency block to the erased designated directory location; verifying that the updated data has been written to the erased designated directory location; and, if it is verified that the updated directory has been written to the erased designated directory location, then erasing the directory consistency block. Relatedly, a user simply accesses the directory consistency block to determine whether or not there is a corrupted directory. If the directory consistency block has been erased, this means that the prior directory update was successful and that there is no corrupted directory. However, if the directory consistency block has not been erased, the data in the directory consistency block can be employed to complete the desired directory update.

An object of the present invention is to overcome the aforementioned problems associated with prior art corrupted data indicators for MO disks.

Another object is to provide a method and system for indicating whether or not there is corrupted data on a MO disk by simply accessing a single data consistency block on the MO disk.

A further object is to accomplish the preceding objective and in addition implement a recovery of the updated data by employing the data in the data consistency block.

Still another object is to accomplish the preceding object with simply a two-pass write, a following three-pass write, and a one-pass erase.

Still a further object is to provide a procedure which can be implemented in a programmable computer system and various peripherals for indicating whether or not there is corrupted data when accessing a single data consistency block on an MO disk, and if the data is corrupt, employing the data on the data consistency block to implement a recovery.

Other objects will become apparent when considered in light of the following description of the invention.

DETAILED DESCRIPTION OF THE PREFERRED EMBODIMENTS

Figure 1:
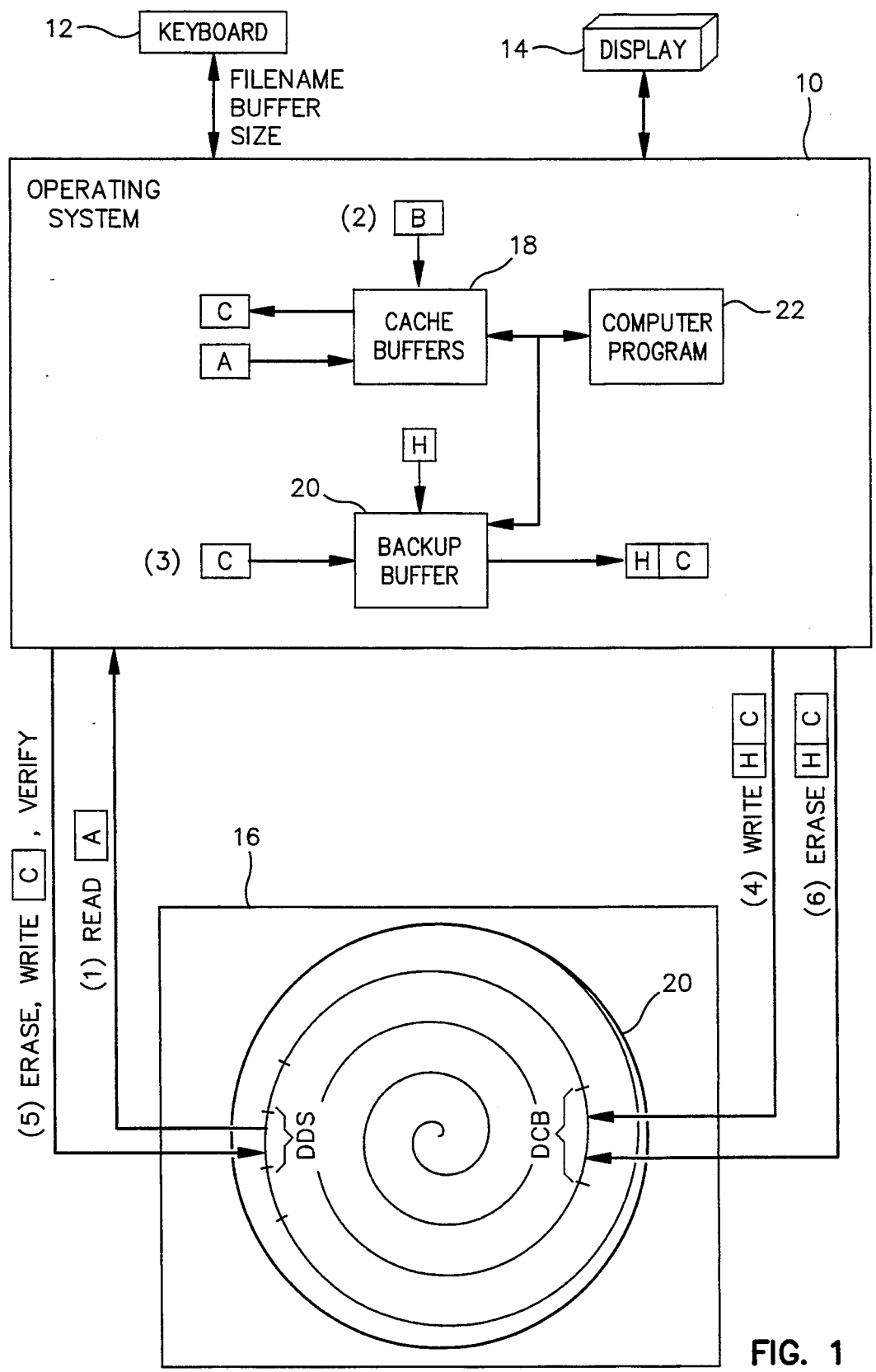
FIG. 1 is a schematic illustration of a computer system configured for the write portion of the invention.

Referring now to the drawings wherein like reference numerals designate like or similar parts throughout the several views, there is illustrated in FIG. 1 a programmable computer system including an operating system 10, a keyboard 12, a display 14 and a rewritable optical disk drive 16. The operating system 10 includes one or more cache buffers 18, a backup buffer 19 and is linked to a computer program 22. The invention can be implemented by a user at the keyboard and the display who desires to update data on a magneto-optical (MO) disk 20 which is mounted in the drive 16. Since the updating of a directory on the disk 20 is more important to protect than other data updates, the following description will be confined to directory updates with the understanding that it is equally applicable to updating all types of data on an MO disk.

The invention is initiated by a user via the keyboard 12 to make a data update or insertion to a file on the MO disk 20. In response to the keyboard entry the operating system 10 initiates a file name and designates a cache buffer of a size sufficient to hold the data. The entries to the cache buffers 18, backup buffer 19 and the MO disk 20 are implemented by the computer program 22 which is illustrated in more detail in FIGS. 4, 5, and 6. The various data entries implemented by the computer program 22 are represented by A, B, C and H which are shown in rectangles in FIG. 1 and are likewise shown and explained in more detail in FIG. 3. Also, as explained in FIG. 3, important sector portions of the MO disk 20, as shown in FIG. 1, are the designated directory sectors (DDS) and the directory consistency block (DCB). Accordingly, FIGS. 3, 4, 5 and 6 should be referred to in the following description of FIG. 1.

Figure 4:
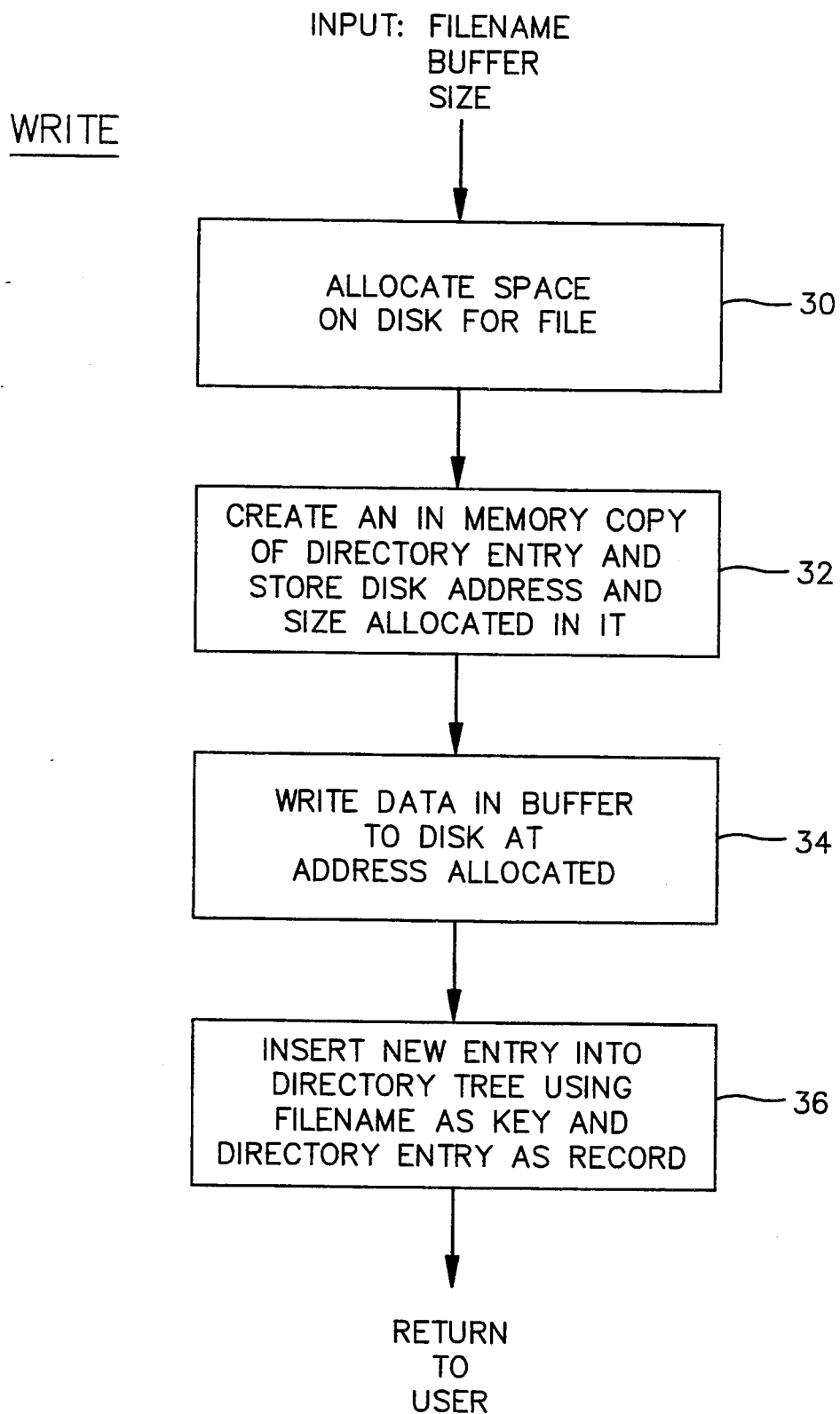
FIG. 4 is a simplified flow diagram for updating data and a corresponding directory on an MO disk.

After receiving a keyboard entry for a data update, space is allocated on the MO disk 20 for the data update in a file as shown at 30 in FIG. 4. The data to be updated may be stored in the backup buffer 19. As shown at 32, an in-memory copy of a directory entry is created and a disk address and allocated size are stored in it. As shown at 34, data is written from the backup buffer 19 to the MO disk at the address allocated. It should be noted that the sequence of the blocks 32 and 34 could be reversed. At 36, the procedure inserts the new entry into a directory tree on the MO disk 20, using the file name as the key and the directory entry as the record. Operation of the system is then returned to the user.

Figure 3:
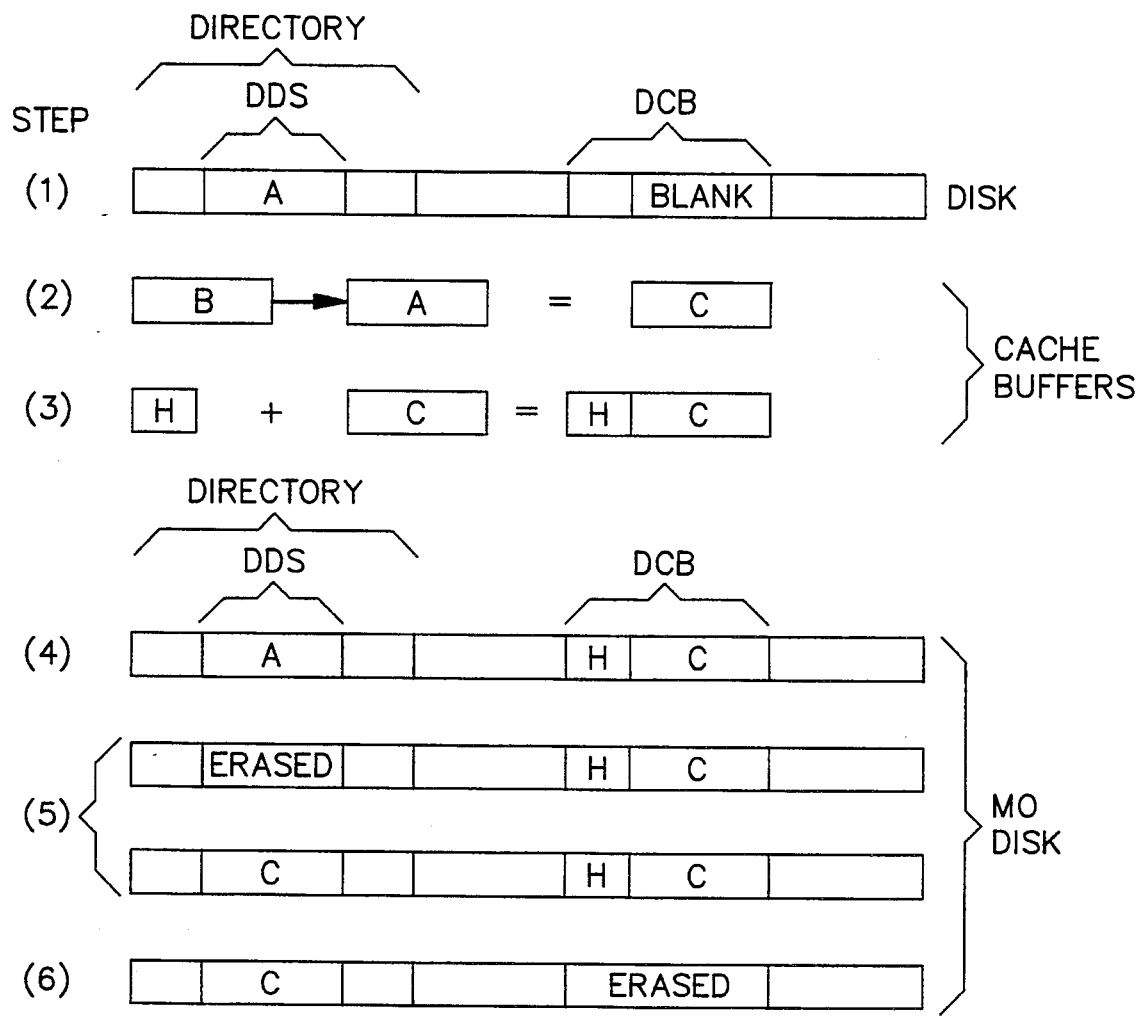
FIG. 3 is a schematic illustration of various data items and nomenclature applicable to FIGS. 1 and 2.
Figure 5:
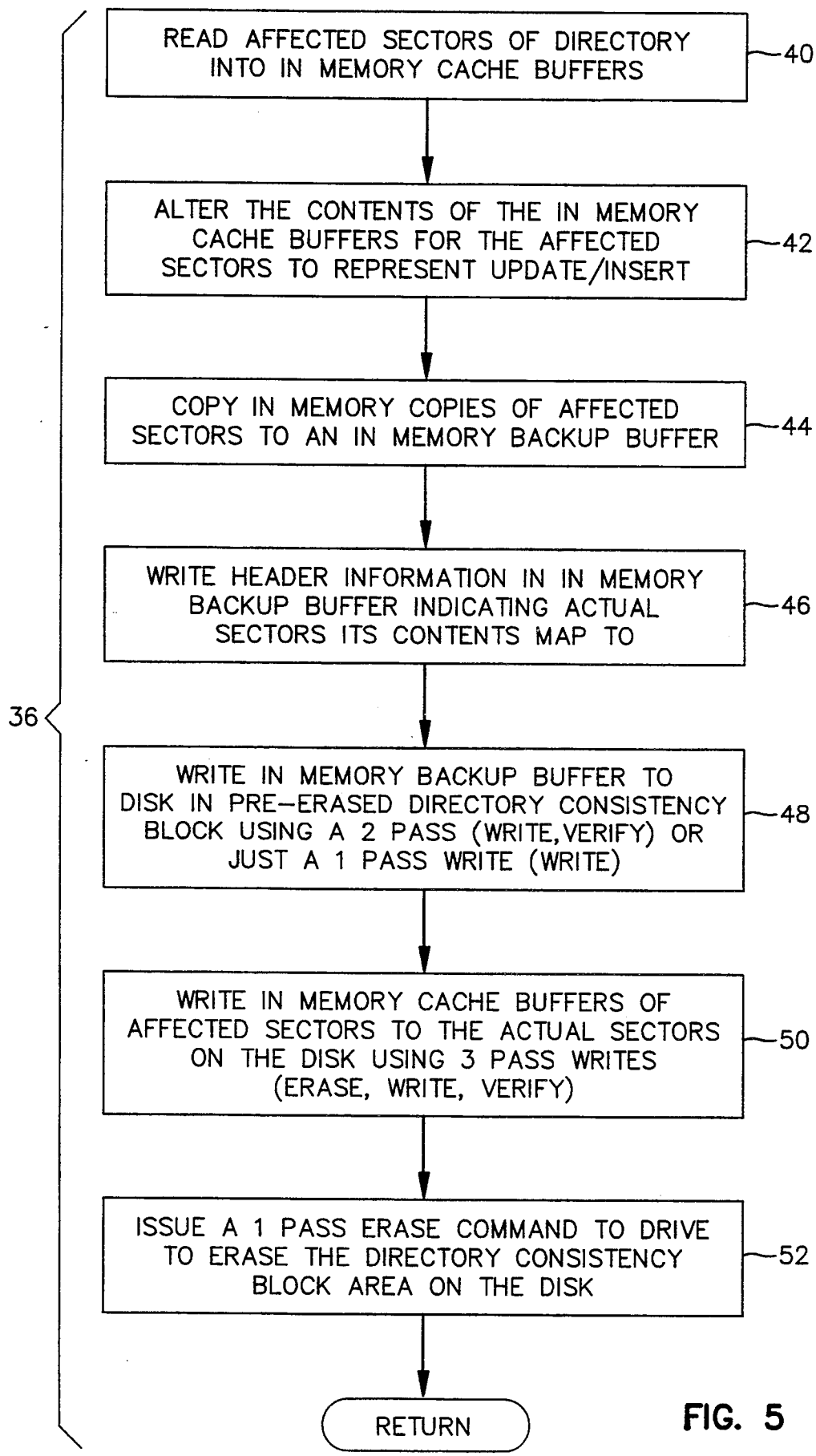
FIG. 5 is a more detailed flow diagram for updating a directory on an MO disk.

Referring now to FIGS. 1, 3, and 5, block 36 of the procedure illustrated in FIG. 4 is shown in greater detail. In FIG. 5 there is shown at block 40 the step of copying from the MO disk to a memory medium, such as the cache buffers 18, designed sectors (DDS) which contain the portion of the directory which is to be updated. At block 42 in FIG. 5, the directory portion copied in block 40 is updated in the cache buffers to provide an updated directory portion. This is also illustrated at step (2) of FIGS. 1 and 3 where the directory portion A is copied from DDS to a cache buffer and updated with B to produce C. At block 44 in FIG. 5, the updated directory portion is written to a backup buffer 19 after updating the directory portion in the cache buffers 18. This is illustrated at step (3) in FIGS. 1 and 3 where updated directory portion C is copied to a backup buffer 19. At block 46 in FIG. 5, a header is added to the directory portion in the backup buffer 19. This is illustrated at step (3) in FIGS. 1 and 3 where header H is prepended to C. As shown at block 48 in FIG. 5, the updated directory portion with the header information is written to the directory consistency block (DCB) on the MO disk 20 so as to provide a backup of the updated directory portion. This is shown at step (4) in FIGS. 1 and 3 where HC is written to the DCB. Step (4) of FIGS. 1 and 3 can be accomplished with a one-pass write or a two-pass write (write and verify). At block 50 in FIG. 5, the designated sectors (DDS) are erased from the MO disk 20, the updated directory portion is written from the cache buffers 18 to the designated sectors (DDS) and verification is made that the updated directory portion has been written to the designated sectors (DDS) on the disk. This is illustrated at step (5) in FIGS. 1 and 3. This step is accomplished by a three-pass write (erase, write, and verify). At block 52 in FIG. 5, the directory consistency block (DCB) on the MO disk 20 is erased if there is verification that the updated directory portion has been written to the designated sectors (DDS) on the disk. This is shown by step (6) in FIGS. 1 and 3. This step is accomplished simply by a one-pass erase. As shown in FIG. 5, the operation is then returned to the user.

The directory consistency block (DCB) now gives a positive indication as to whether or not the directory in the designated directory sectors (DDS) of the MO disk 20 has been properly updated. If the DCB has been erased, this will indicate that the directory portion at the DDS on the disk has been properly updated, and if the DCB has not been erased this will indicate that the directory at the DDS on the disk has not been properly updated. Improper updating may be caused by a power outage between the erase and write passes to the DDS or by any interruption between the erase and write passes or by any interruption preventing completion of all sector updates. If the directory in the DDS on the MO disk 20 has not been properly updated the unerased DCB can be employed to properly update such directory. This is implemented as follows.

Figure 2:
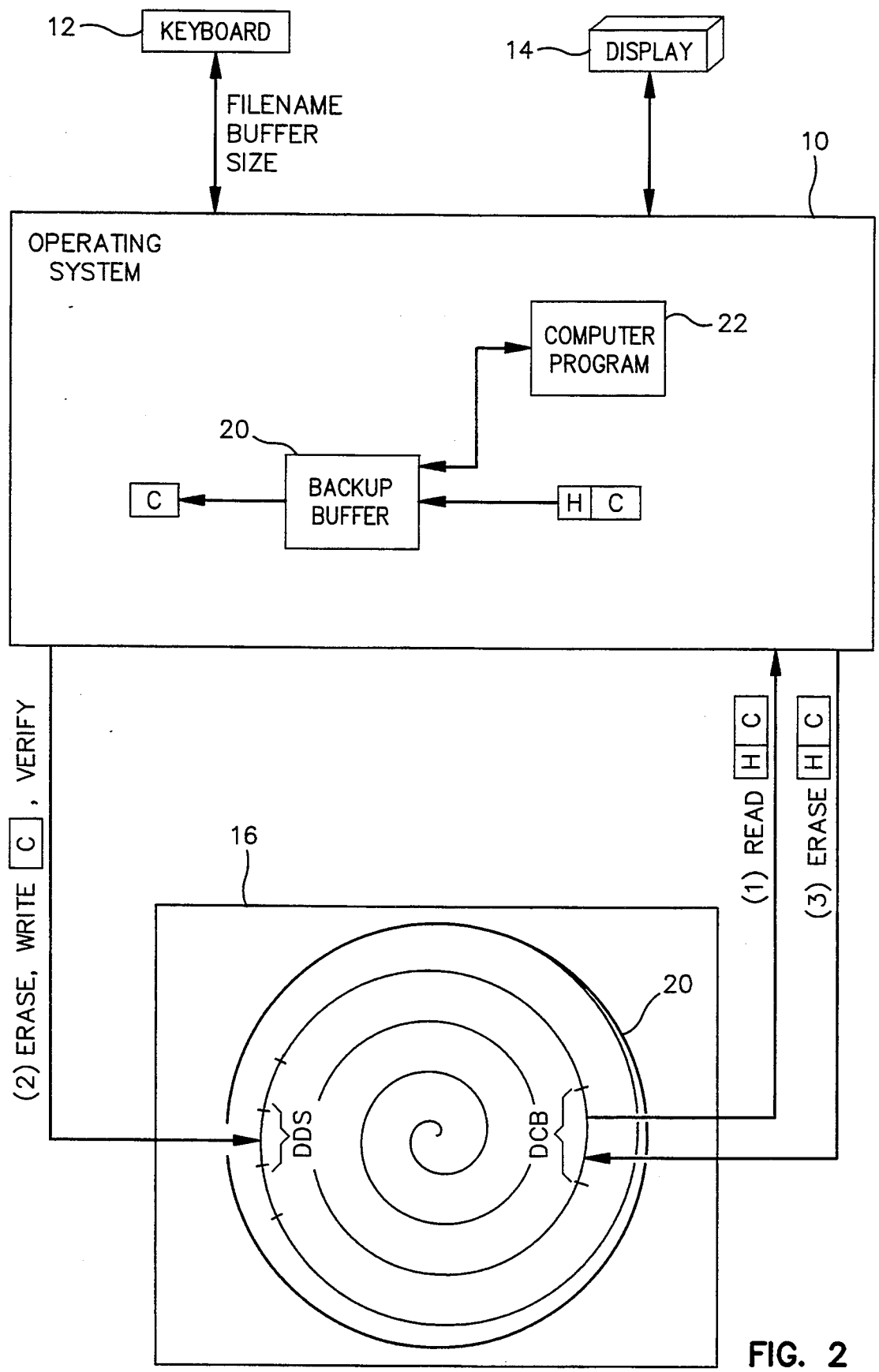
FIG. 2 is a schematic illustration of the computer system configured for the mount portion of the invention.
Figure 6:
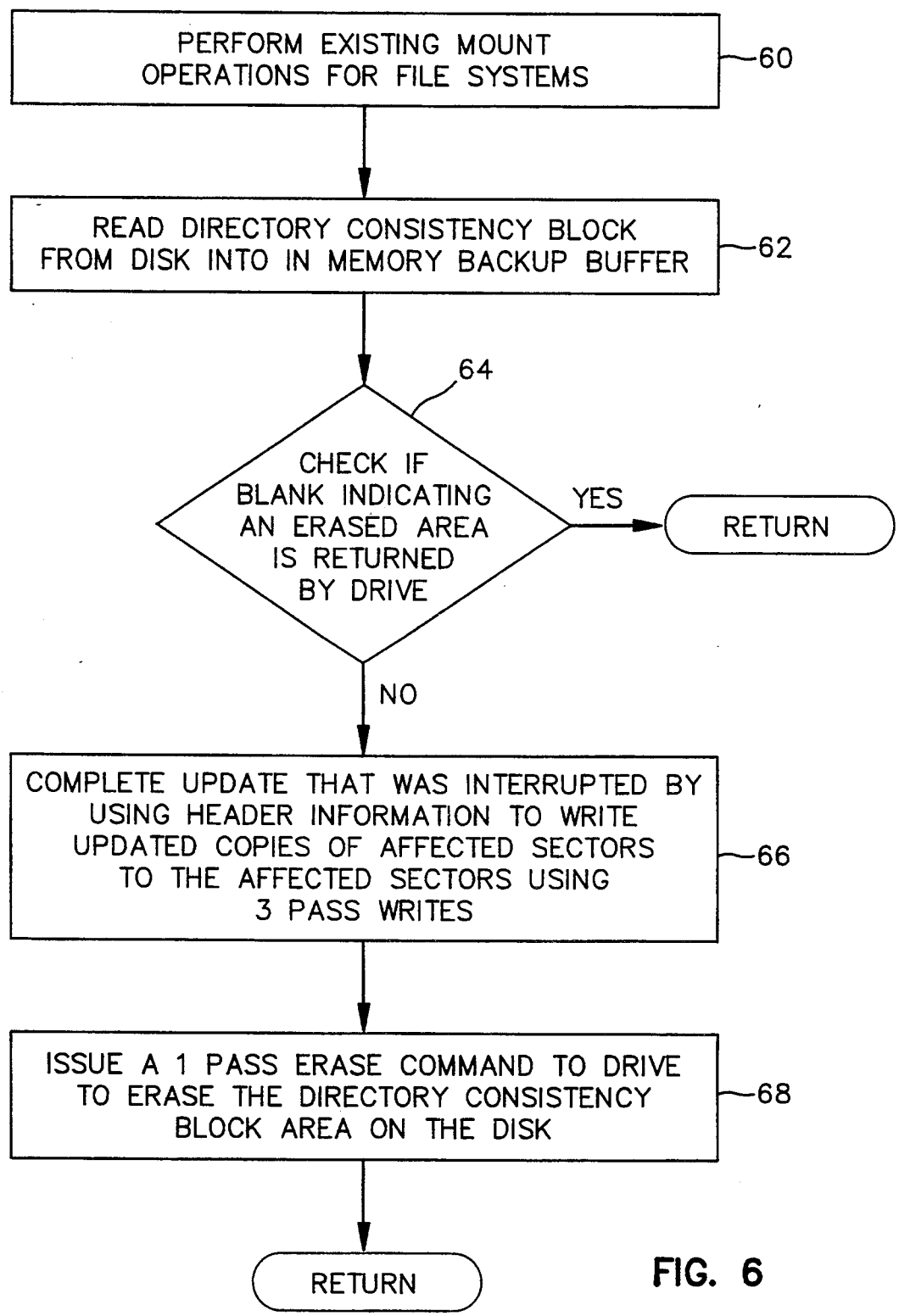
FIG. 6 is a flow diagram for a subsequent mounting of the MO disk in a disk drive.

FIG. 6 illustrates a portion of the method embodied in the computer program 22 which determines whether or not an update has been properly made to the directory in the DDS of the MO disk 20, and if not, implements a proper update thereto. This part of the computer program is implemented when a user mounts the MO disk into the drive 16 not knowing whether the previous directory update was properly made. The hardware implementation of this part of the program and the interfacing is illustrated in FIG. 2. As illustrated at block 60 in FIG. 6, the computer program 22 first performs any required mount operations for the file system. At block 62, a data consistency block (DCB) is read from the MO disk 20 to a storage medium, such as the backup buffer 19. This is illustrated at step (1) in FIG. 2. At decision 64 in FIG. 6, a determination is made whether or not the directory consistency block (DCB) has been erased, the DCB containing the last updated directory portion with the header information if the DCB has not been erased. If the DCB has been erased, this means that the update has been properly made to the directory and that the computer program portion set forth in FIG. 6 can then be implemented. If the answer to decision 64 in FIG. 6 is no, this means that the DCB has not been erased. In this case, provision is made at block 66 for erasing (possibly a second time) the designated directory sectors (DDS) on the MO disk 20, writing the updated data from the DCB to the erased DDS and verifying that the updated data has been written to the DDS. This is illustrated at step (2) in FIG. 2 and is accomplished by a three-pass write (erase, write and verify). At block 68, the DCB is erased if the write to the DDS has been verified. This is illustrated at step (3) in FIG. 2 and is accomplished by a one-pass erase. The operation is then returned to the user at which time the user may wish to enable that portion of the computer program shown in FIG. 5 for implementing a data update and corresponding directory update.

Figure 7:
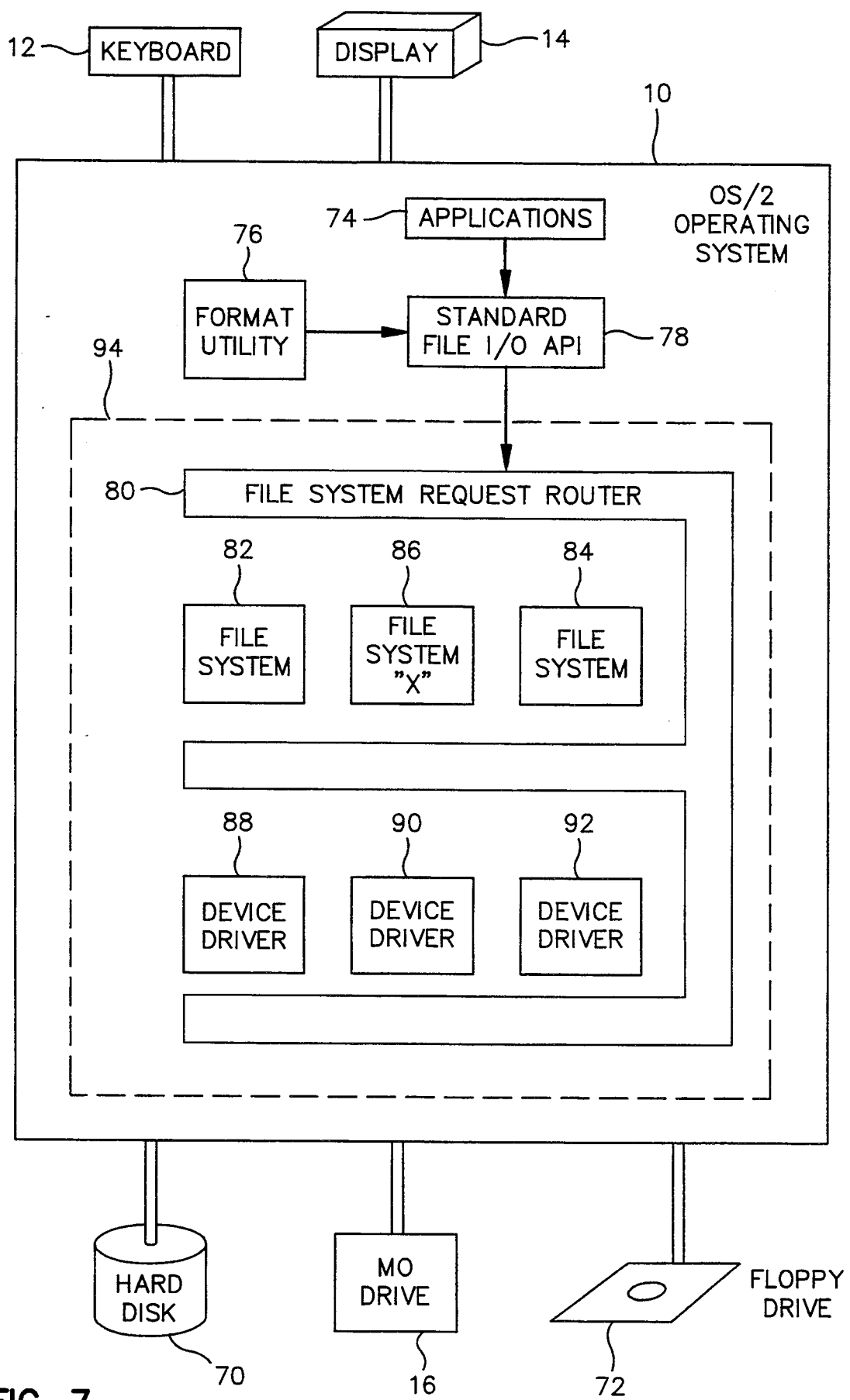
FIG. 7 is a schematic illustration of an exemplary programmed computer system for implementing the present invention.

FIG. 7 is a block diagram illustrating the operational environment of the present invention in the context of a programmed digital computer with an OS/2 operating system 10. Although the description contemplates that the invention would comprise program sequences executed by a programmed digital computer running an OS/2 operating system, the invention may be employed in the context of other operating systems, such as DOS, WINDOWS and so on. The present invention implements the novel program sequences which are illustrated in FIGS. 1-6 and discussed above. The operating system 10 provides an interface between the keyboard 12, the display 14, a hard disk 70, the MO drive 16 and a floppy drive 72. The operating system 10 includes linkages to one or more applications 74 and format utilities 76 linked to a standard file I/O application program interface (API) 78. The standard file I/O API 78 functions as a dynamic link library and interfaces with a file system request router 80. The file system request router 80 provides selective access to a plurality of file systems 82, 84, file system "X" at 86 and device drivers 88, 90 and 92. The invention is incorporated with the box labeled file system X at 86. The invention implements algorithmic changes to file system X. The file system X, as well as all of the other boxes within the OS/2 operating system 10 represent software entities. The format utilities 76, applications 74, standard file I/O API 78, file system request router 80, file systems 82, 84, file system X 86 and device drivers 88, 90 and 92 are all implemented using software.

The file system request router 80, file systems 82, 84, and file system X 86, and device drivers 88, 90 and 92 function together to provide an installable file system 94. The file system 94 is used to define the relationships among the operating system 10, the file systems 82, 84, 86, and the device drivers 88, 90 and 92.

The file system 94 supports the co-existence of multiple, active file systems 82, 84 and 86 within a single computer. Multiple logic volumes (partitions) are allowed. Multiple and/or different types of data storage drives may be employed. Particular file systems 82, 84 and 86 may conduct their own buffer management and I/O without intermediate buffering.

The file system request rooter 80 directs the file system function calls to the appropriate file system 82, 84 and 86 for processing. The file systems 82, 84 and 86 manage I/O and control the format of information on the storage media. The device drivers 88, 90 and 92 manage physical I/O with data storage devices. The device drivers 88, 90 and 92 do not understand the format of information on the data storage drive.

Standard file I/O is performed through the standard file I/O application program interface (API) 78. This software application makes a function call and the file system request router 80 passes the request to the proper file system 82, 84 and 86 for further processing. New APIs may be provided by a file system 82, 84 and 86 to implement functions specific to the files system or not supplied through the standard file I/O interface. New APIs are provided in a dynamic link library that uses a standard function call, such as the DosFsCtl call, to communicate with a specific file system 82, 84, 86. Additional details of the OS/2 operating system are found in co-pending U.S. application Ser. No. 07/931,089 filed Aug. 14, 1992 and commonly assigned to IBM.

The exact definition of a file system, the location of the file system, and the particular commands supported by the system all vary from system to system. As stated hereinabove, the invention can be used in conjunction with operating systems other than the OS/2 operating system. For instance, the invention can be described in the context of a simplified file system command set. This command set is representative of basic file system operations, and consists of the following five commands which are similar to the existing OS/2 commands. The commands are FORMAT, MOUNT, UNMOUNT, READ, and WRITE. These commands have been simplified to emphasize the novel aspects of the present invention.

The FORMAT command initializes and re-initializes a disk for use. MOUNT prepares the system for use of a disk. The input to this command is a variable to specify a drive. Unmount indicates to the file system that the disk is no longer to be worked with. The input to this command is the drive specification variable. READ instructs the system to read a file's contents into a buffer given the file name. The inputs to READ are the drive specification variable, the file name, and an identifier specifying the user buffer to which the contents of the file will be placed.

WRITE is used to write data to a file. If the file does not exist, the file is created. If the file exists, it is modified. The inputs are the drive specification variable, the name of the file to write, and identifier specifying a particular user buffer, and the size, or amount, of the data.

The FORMAT, MOUNT, UNMOUNT, READ, and WRITE operations provide a simple file system paradigm. A system user employs the file system by first formatting a new disk with the FORMAT operation or re-formatting of an old disk. After a disk is formatted, the disk is mounted, using the MOUNT operation. At this time, files may be read or written using the READ or WRITE operations. When reading and writing have been completed, the user unmounts the disk.

It is manifest that the present invention provides a unique means and method of indicating whether or not an update has been properly made to a directory on a MO disk. The invention is implemented with a minimum of passes to the MO disk. Most importantly, however, is that a block on the MO disk, called the directory consistency block (DCB), serves a dual function. This block indicates whether or not the directory on the MO disk has been properly updated by its erased and unerased conditions. Further, the block is utilized for updating the directory on the MO disk if the directory has not been properly updated. The directory consistency block takes the place of the former intent and update counters which were written to the MO disk by two three pass writes. It should be understood that the invention can be utilized for making data entries to the MO disk other than directory updates. The present invention can also be used with other operating systems and file systems as described hereinabove. Further, the invention can be applied to other environments, such as an optical library.

Obviously, many modifications and variations of the present invention are possible in light of the above teachings. It is therefore to be understood that, within the scope of the appended claims, the invention may be practiced other than as specifically described.

We claim:

1. A method executed by a programmed digital computer for making a data update to a recordable media device of the type which must be erased before the update is made, the method comprising the steps of:

reading a portion of the data to be updated from the recordable media device and storing the data portion in a memory medium;

updating the data portion in the memory medium to produce an updated data portion;

writing backup information including the updated data portion with header information from the memory medium to a data consistency block on the recordable media device;

erasing the data portion to be updated from the recordable media device to provide erased designated data locations on the recordable media device;

writing the updated data portion from the memory medium to the erased designated data location;

verifying whether the updated data portion has been written in the erased designated data locations; and erasing the backup information in the data consistency block if there is verification that the updated data portion has been written to the erased designated data locations; otherwise, leaving the backup information in the data consistency block; then upon subsequent processing of the recordable media device, indicating by the absence of the backup information in the data consistency block that the data portion has been updated, and indicating by the presence of the backup information in the data consistency block that the data portion has not been updated, and, if the data portion has not been updated, updating the data on the recordable media device with the backup information.

2. A method as claimed in claim 1 including the steps of:

the memory medium where the reading and the updating of the data portion occurs including a plurality of cache buffers; and the reading step including storing the data portion in a cache buffer;

the updating step including updating the data portion in the cache buffer to produce the updated data portion;

after updating the data portion in the cache buffer, writing the updated data portion to a backup buffer;

adding the header information to the updated data portion in the backup buffer; and writing the updated data portion with the header information from the backup buffer to the data consistency block on the recordable media device.

3. A method as claimed in claim 1 including the steps of:

the updated data portion being an updated directory portion.

4. A method as claimed in claim 1 including the steps of:

after writing the updated data portion with the header information to the data consistency block, verifying that the writing has occurred.

5. A method as claimed in claim 1 including the steps of:

the header information including the location of the erased designated data locations on the recordable media device.

6. A method as claimed in claim 1 including the steps of:

mounting the recordable media device in a drive device;

reading the data consistency block from the recordable media device into a memory storage medium;

determining whether or not the data consistency block has been erased, the data consistency block containing the last updated data portion with the header information if the data consistency block has not been erased;

if the data consistency block has not been erased, then erasing the designated data locations on the recordable media device;

writing the updated data, from the data consistency block to the erased designated data locations;

verifying that the updated data has been written to the erased designated data locations; and if it is verified that the updated data has been written to the designated data locations, then erasing the data consistency block.

7. A method as claimed in claim 6 including the steps of:

the header information including the locations of the erased designated data locations on the recordable media device.

8. A method as claimed in claim 7 including the steps of:

the memory medium where the reading and the updating of the data portion occurs including a plurality of cache buffers; and the reading step including storing the data portion in a cache buffer;

the updating step including updating the data portion in the cache buffer to produce the updated data portion;

after updating the data portion in the cache buffer writing the updated data portion to a backup buffer;

adding the header information to the updated data portion in the backup buffer; and writing the updated data portion with the header information from the backup buffer to the data consistency block on the recordable media device.

9. A method as claimed in claim 8 including the step of:

after writing the updated data portion with the header information to the data consistency block, verifying that the writing has occurred.

10. A method as claim in claim 9 including:

the data portion being a directory portion.

11. A method as claimed in claim 10 including the step of:

if the data consistency block has not been erased, first writing the updated data portion with the header information to the backup memory buffer and then utilizing the header information to map the updated data portion to the erased designated data locations on the recordable media device.

12. A method executed by a programmed digital computer for making a directory update to a magneto-optic disk, the method comprising the steps of:

copying from the disk to a memory medium designated directory sectors which contain a portion of the directory which is to be updated;

updating the directory portion in the memory medium to provide an updated directory portion;

writing the updated directory portion with header information to a directory consistency block on the disk;

erasing the designated directory sectors from the disk;

writing backup information including the updated directory portion from the memory medium to the designated directory sectors;

verifying that the updated directory portion has been written to the designated directory sectors on the disk; and erasing the directory consistency block if there is verification that the updated directory portion had been written to the designated directory sectors on the disk, upon subsequent processing of the disk, indicating by the absence of the backup information in the directory consistency block that the directory on the disk has been updated, and indicating by the presence of the backup information in the directory consistency block that the directory on the disk has not been updated, and, if the directory has not been updated, updating the directory on the disk with the backup information.

13. A method as claimed in-claim 12 including the steps of:

the memory medium where the reading and the updating of the directory portion occurs including a plurality of cache buffers;

the reading step including storing the data portion in a cache buffer;

the updating step including updating the data portion in the cache buffer to produce the updated data portion;

after updating the directory portion in the cache buffers writing the updated directory portion to a backup buffer;

adding the header information to the directory portion in the backup buffer; and writing the updated directory portion with the header information from the backup buffer to the directory consistency block on the recordable media device.

14. A method as claimed in claim 12 including the step of:

after writing the updated directory portion with the header information to the directory consistency block, verifying that the writing has occurred.

15. A method as claimed in claim 12 including:

the header information including the locations of the erased designated directory sectors on the disk.

16. A method as claimed in claim 12 including the steps of:

mounting the disk in a drive;

reading the data consistency block from the disk into a memory storage medium;

determining whether or not the directory consistency block has been erased, the directory consistency block containing the last updated directory portion with the header information if the directory consistency block has not been erased;

if the directory consistency block has not been erased, then erasing the designated directory sectors on the disk;

writing the updated data from the directory consistency block to the erased designated directory sectors;

verifying that the updated data has been written to the erased designated directory sectors; and if it is verified that the updated directory has been written to the erased designated directory sectors, then erasing the directory consistency block.

17. A method as claimed in claim 16 including:

the header information including the location of the erased designated directory sectors on the disk.

18. A method as claimed in claim 17 including the steps of:
- the memory medium where the reading and the updating of the directory portion occurs including a plurality of cache buffers;
- the reading step including storing the data portion in a cache buffer;
- the updating step including updating the data portion in the cache buffer to produce the updated data portion;
- after updating the directory portion in the cache buffers writing the updated directory portion to a backup buffer;
- adding the header information to the updated directory portion in the backup buffer; and
- writing the updated directory portion with the header information from the backup buffer to the directory consistency block on the recordable media device.

19. A method as claimed in claim 18 including the step of:
- after writing the updated directory portion with the header information to the directory consistency block verifying that the writing has occurred.

20. A method as claimed in claim 19 including the step of: if the directory consistency block has not been erased, first writing the updated directory portion with the header information to the backup memory buffer and then utilizing the header information to map the updated directory portion to the erased designated directory sectors on the recordable media device.

21. A system for making a directory update to a magneto-optic disk comprising:
- a programmable computer system including a memory medium and a computer program;
- a drive connected to the computer system for receiving the disk and performing read/write functions thereon;
- the computer program controlling the memory medium and the drive, the computer program including:
  - means for copying from the disk to the memory medium designated sectors which contain a portion of the directory which is to be updated;
  - means for updating the directory portion in the memory medium to provide an updated directory portion;
  - means for writing the updated directory portion with header information to a directory consistency block on the disk;
  - means for erasing the designated directory sectors from the disk;
  - means for writing the updated directory portion from the memory medium to the designated directory sectors;
  - means for verifying that the updated directory portion has been written to the designated directory sectors on the disk; and
  - means for erasing the directory consistency block if there is verification that the updated directory portion has been written to the designated directory sectors on the disk,
- whereby, upon subsequent processing of the disk, an erased status of the directory consistency block will indicate that the directory on the disk has been properly updated and an unerased status of the directory consistency block will indicate that the directory on the disk has not been properly updated, and, if the disk has not been properly updated, the data in the unerased directory consistency block can be employed to properly update the directory on the disk.

22. A system as claimed in claim 21 including;
- the memory medium where the reading and the updating of the directory portion occurs including a plurality of cache buffers; and
- the computer program further including:
  - means for writing the updated directory portion to a backup buffer after updating the directory portion in the cache buffers;
  - means for adding the header information to the directory portion in the backup buffer; and
  - means for writing the directory portion with the header information from the backup buffer to the directory consistency block on the recordable media device.

23. A system as claimed in claim 21 wherein the computer program further includes:
- after writing the updated directory portion with the header information to the directory consistency block, verifying that the writing has occurred.

24. A system as claimed in claim 21 including:
- the header information including the locations that the updated data information maps to, which locations are the erased designated directory sectors on the disk.

25. A system as claimed in claim 21 wherein the computer program further includes:
- means for reading the data consistency block from the disk into a memory storage medium;
- means for determining whether or not the directory consistency block has been erased, the directory consistency block containing the last updated directory portion with the header information if the directory consistency block has not been erased;
- means for erasing the designated directory sectors on the disk if the directory consistency block has not been erased,
- means for writing the updated data from the directory consistency block to the erased designated directory sectors;
- means for verifying that the updated data has been written to the designated directory sectors; and
- means for erasing the directory consistency block if there is verification that the updated data has been written to the designated directory sectors.

26. A system as claimed in claim 25 including:
- the header information including the locations that the updated data information maps to, which locations are the erased designated directory sectors on the recordable media device.

27. A system as claimed in claim 26 including;
- the memory medium where the reading and the updating of the directory portion occurs including a plurality of cache buffers; and
- the computer program further including:
  - means for writing the updated directory portion to a backup buffer after updating the directory portion in the cache buffers;
  - means for adding the header information to the updated directory portion in the backup buffer; and
  - means for writing the updated directory portion with the header information from the backup buffer to the directory consistency block on the recordable media device.

28. A system as claimed in claim 27 wherein the computer program further includes:
after writing the updated directory portion with the header information to the directory consistency block, verifying that the writing has occurred.

29. A system as claimed in claim 28 wherein the computer program further includes:
means, operable if the directory consistency block has not been erased, for writing the updated directory portion with the header information in the backup memory buffer and then utilizing the header information to map the updated directory portion to the erased designated directory sectors on the recordable media device.

* * * * *